July 15, 1924.
C. F. BENJAMIN
MECHANIC'S INSTRUMENT
Filed April 7, 1923
1,501,837
2 Sheets-Sheet 1
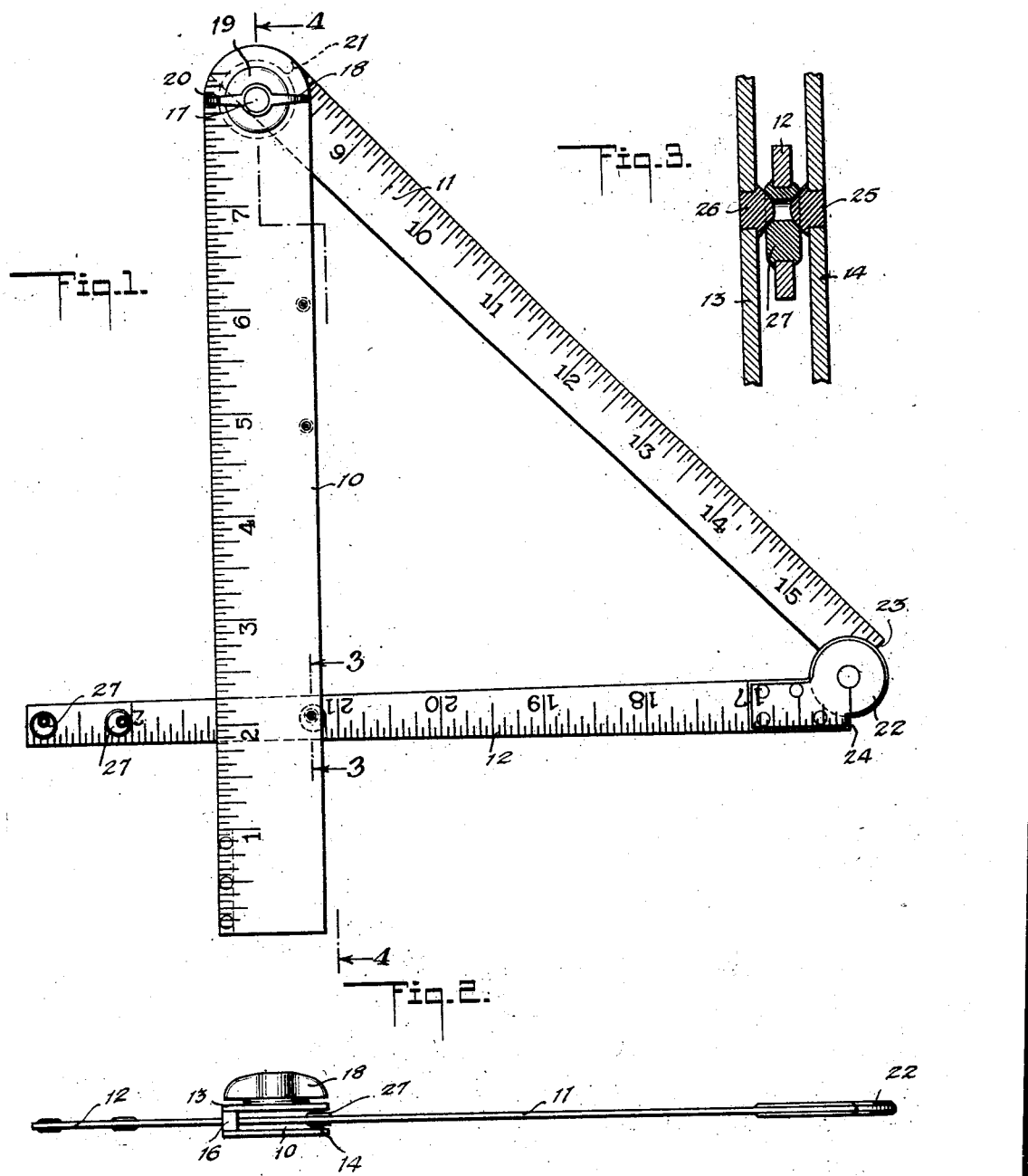
WITNESSES
INVENTOR
CLARENCE F. BENJAMIN
ATTORNEYS

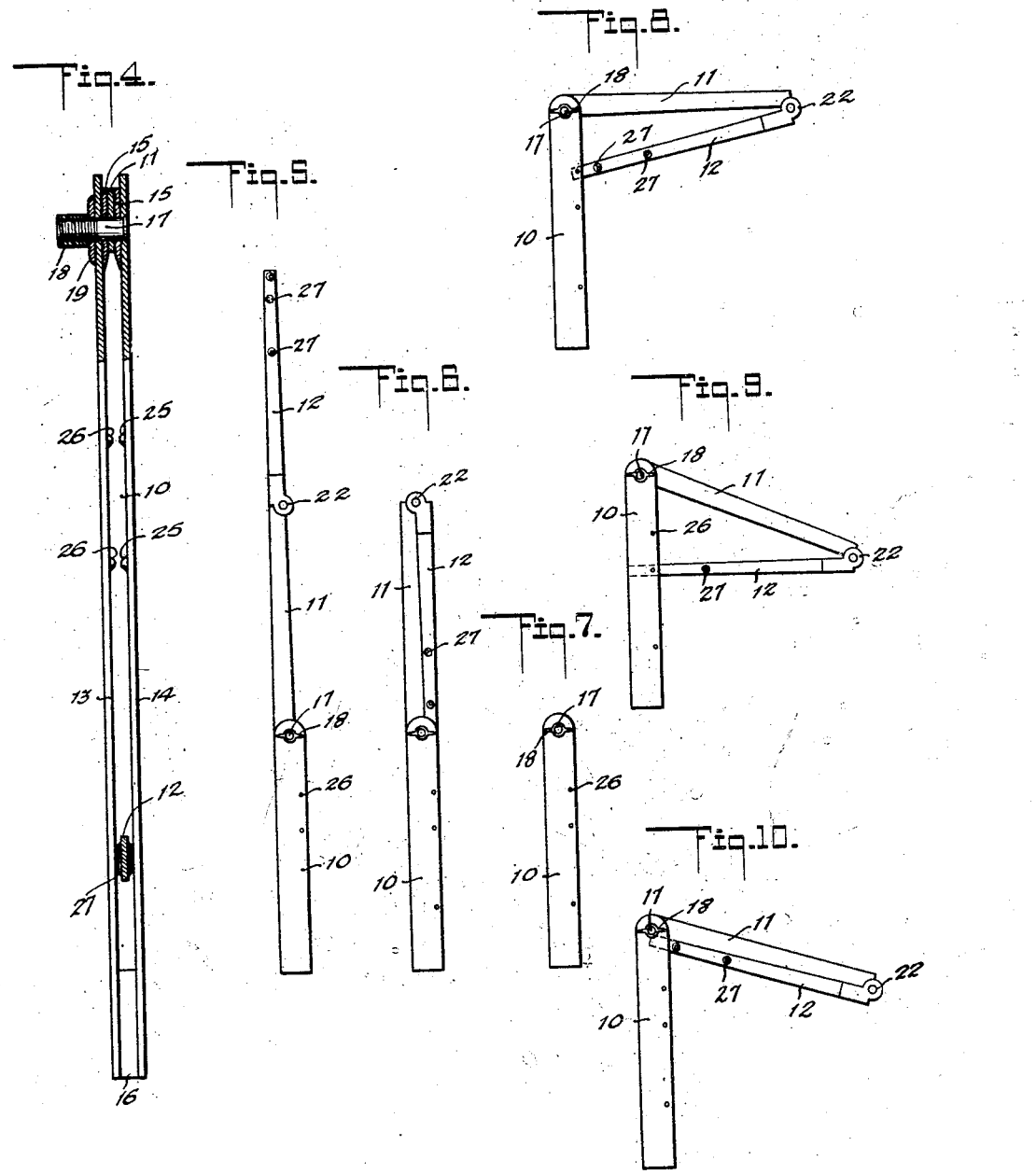

Patented July 15, 1924.

1,501,837

UNITED STATES PATENT OFFICE.

CLARENCE FRANKLIN BENJAMIN, OF MILFORD, CONNECTICUT.

MECHANIC'S INSTRUMENT.

Application filed April 7, 1923. Serial No. 630,530.

*To all whom it may concern:*

Be it known that I, CLARENCE F. BENJAMIN, a citizen of the United States, and a resident of Milford, in the county of New Haven and State of Connecticut, have invented new and useful Improvements in Mechanics' Instruments, of which the following is a full, clear, and exact description.

This invention relates to mechanics' instruments.

The general object of this invention is the provision of a mechanic's instrument including a plurality of elements that may be set in different relative positions, giving the instrument different shapes so that it may be used as a square, a miter, a bevel and a rule.

A further object of the invention is the provision of a mechanic's combination instrument provided with adjustable means for connecting the different members of the instrument so that they may be set at different positions with great accuracy.

These objects are accomplished by pivotally connecting three rule sections so that they may be set in alinement, and providing in conjunction with the rule sections eccentric means for connecting the end sections so that the rule sections may be set in different relative positions to form different instruments.

These and other objects of the invention will be more clearly understood from the following detailed description and accompanying drawings.

Figure 1 is a side view of the instrument, showing it set to form a miter square;

Figure 2 is a plan view looking at the miter square from the top, as shown in Figure 1;

Figure 3 is a section along the line 3—3, Figure 1, showing the construction of the means for connecting the end sections;

Figure 4 is a section along the line 4—4, Figure 1, showing the means for pivotally connecting the central rule section to one of the end sections;

Figure 5 shows the three rule sections alined for a ruler;

Figure 6 shows two of the sections alined;

Figure 7 shows the instrument folded with two of the sections positioned in the third section;

Figure 8 shows the instrument set to form an inside square;

Figure 9 shows the instrument set to form an outside quare;

Figure 10 shows the instrument set for use as a bevel.

Referring to the above-mentioned drawings, the instrument includes three rule sections, 10, 11 and 12 pivotally connected so that they may be set in alinement. The section 10 includes two plate members 13 and 14 spaced apart by the member 16 positioned between one end of the plates and the end of the rule section 11 on which two disks 15 are mounted positioned between the other ends of the plates. Extending through openings provided in the plates 13 and 14 and the rule section 11 is a pin 17 which serves pivotally to connect the ends of the sections 10 and 11. The end of the pin 17 is threaded and has mounted thereon a wing nut 18 and washer 19 for use in forcing the plates together to clamp the rule section 11 in different relative positions to the rule section 10. A pin 20 is mounted between the plates 13 and 14 for engaging a shoulder 21 formed on the rule section 11 to set the sections 10 and 11 in alinement, forming a ruler. When the sections have been set in alinement the wing nut 18 may be operated, forcing the sections 13 and 14 together, clamping the rule sections 10 and 11 in alinement.

The rule section 12 is pivotally connected to the rule section 11 by a hinge joint 22 which is of ordinary construction. These rule sections 11 and 12 are provided with shoulders 23 and 24, respectively, which abut when the rule sections 11 and 12 are placed in alinement. The rule sections 11 and 12 are narrower than the rule section 10, the two when placed parallel to one another being approximately the width of the rule section 10. Therefore, when the rule sections 11 and 12 are placed parallel to one another they may be positioned between the plates 13 and 14, thus utilizing the section 10 as a casing for the other two sections.

The means for connecting the sections 12 and 10 so as to give the instrument different shapes includes a plurality of projections 25 and 26 mounted in the plates 14 and 13, respectively and located in pairs. The projections forming each pair are positioned in alinement with one another. A plurality of disks 27 are rotatably mounted in openings provided in the section 12.

These disks have openings formed therein which are located off-center and shaped for receiving the projections 25 and 26. This forms an eccentric connection, providing means for obtaining fine adjustments in the setting of the members in different relative positions to give the instrument different shapes. In mounting the projections 25 and 26 and the disks 27 they are so located that when they are utilized for connecting the sections 10 and 12 an outside square, an inside square and a miter square may be formed at will. By positioning the members 11 and 12 parallel to one another and using the instrument as shown in Figure 10 a bevel is provided. The member 11 may be fixed in any desired position by means of the wing nut 18.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. A mechanic's instrument including a plurality of rule sections pivotally connected in series, means carried by the end sections and adapted for engagement to determine the angle of the several sections relative to one another, and means for adjusting the angle of said elements relative to one another after their angle has been set.

2. A mechanic's instrument comprising a plurality of rule sections pivotally connected in series, a plurality of recessed elements carried by one of the end sections, a plurality of elements carried by the other of said end sections, projections formed on said last-mentioned elements and adapted to be received within the recesses of the first-mentioned elements, and means for rotating one of said elements for giving an adjustment of the pivotally connected sections without disengaging the projections on the second-mentioned elements from the recesses in the first-mentioned elements.

3. A mechanic's instrument comprising a plurality of rule sections pivotally connected in series, a plurality of eccentrically recessed elements carried by one of the end sections, a plurality of elements carried by the other of said end sections, projections formed on said last-mentioned elements and adapted to be received within the recesses of the first-mentioned elements, eccentrically disposed projections formed on said last-mentioned elements and adapted to be received within the recess of the first-mentioned elements, and means for rotating one of said elements for giving an adjustment of the pivotally connected sections without disengaging the projections on the second-mentioned elements with the recesses in the first-mentioned elements.

4. A mechanic's instrument including a plurality of rule sections pivotally connected in series, adjustable means for connecting the end sections of the instrument to give it different shapes, comprising disk members rotatably mounted in one section, said disk members having openings therein which are off-center, and projections formed on the other section for seating in said openings to establish connections between the sections.

5. A jack knife rule, comprising three rule sections pivotally connected in series, one of said rule sections including two spaced plates between which the other sections may be positioned, and means for connecting the end sections in different relative positions to give the jack knife rule different shapes forming different instruments.

6. A mechanic's instrument, comprising three rule sections pivotally connected so that they may be alined, one of the end sections including two plates spaced apart and rigidly connected together, the other sections being mounted to swing between said plates, disks rotatably mounted in the other end section, said disks having openings extending therethrough and located off-center, and means formed on the first-mentioned end section for seating in said openings to establish connection between the end sections retaining the instrument in different shapes.

CLARENCE FRANKLIN BENJAMIN.